UNITED STATES PATENT OFFICE.

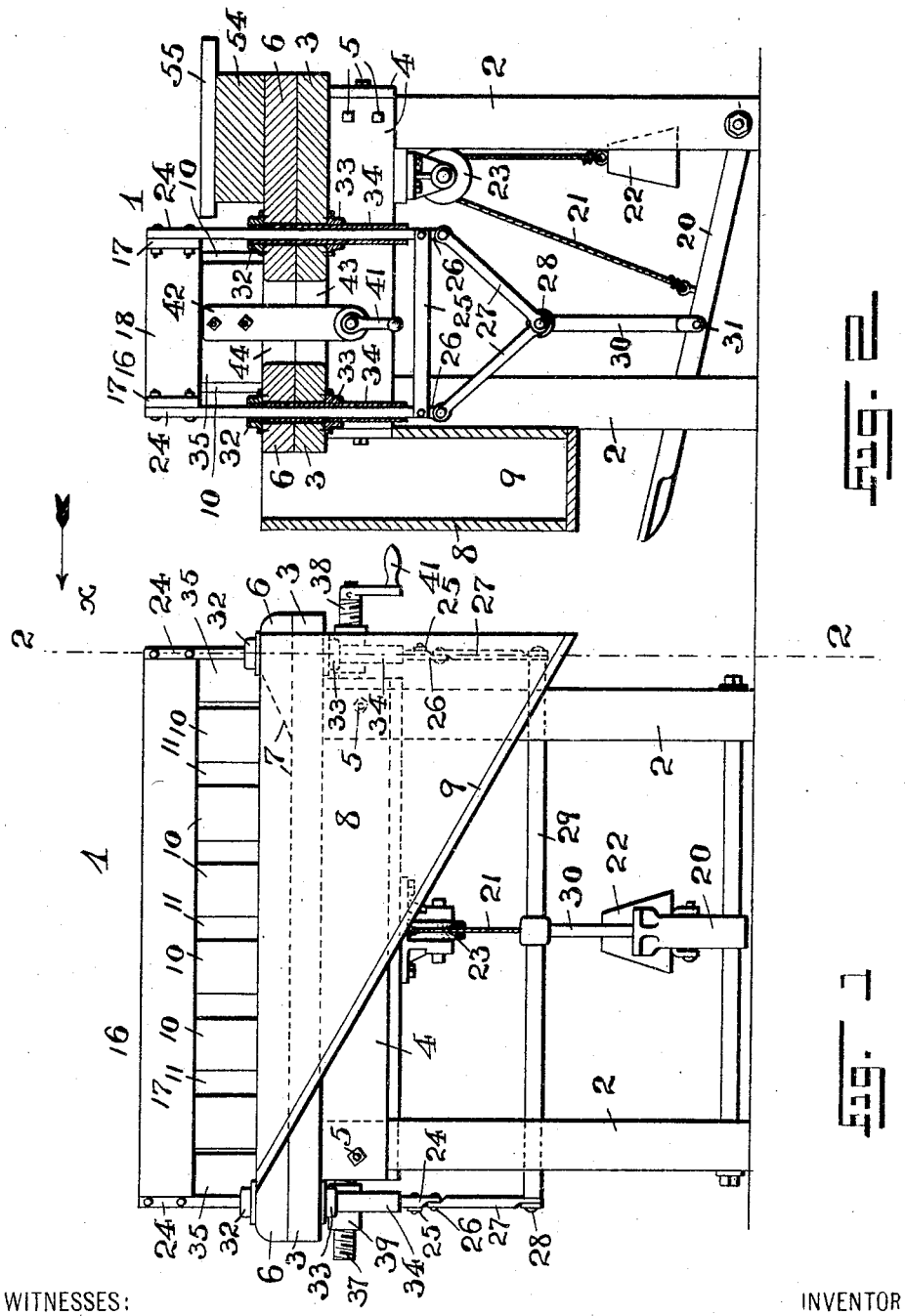

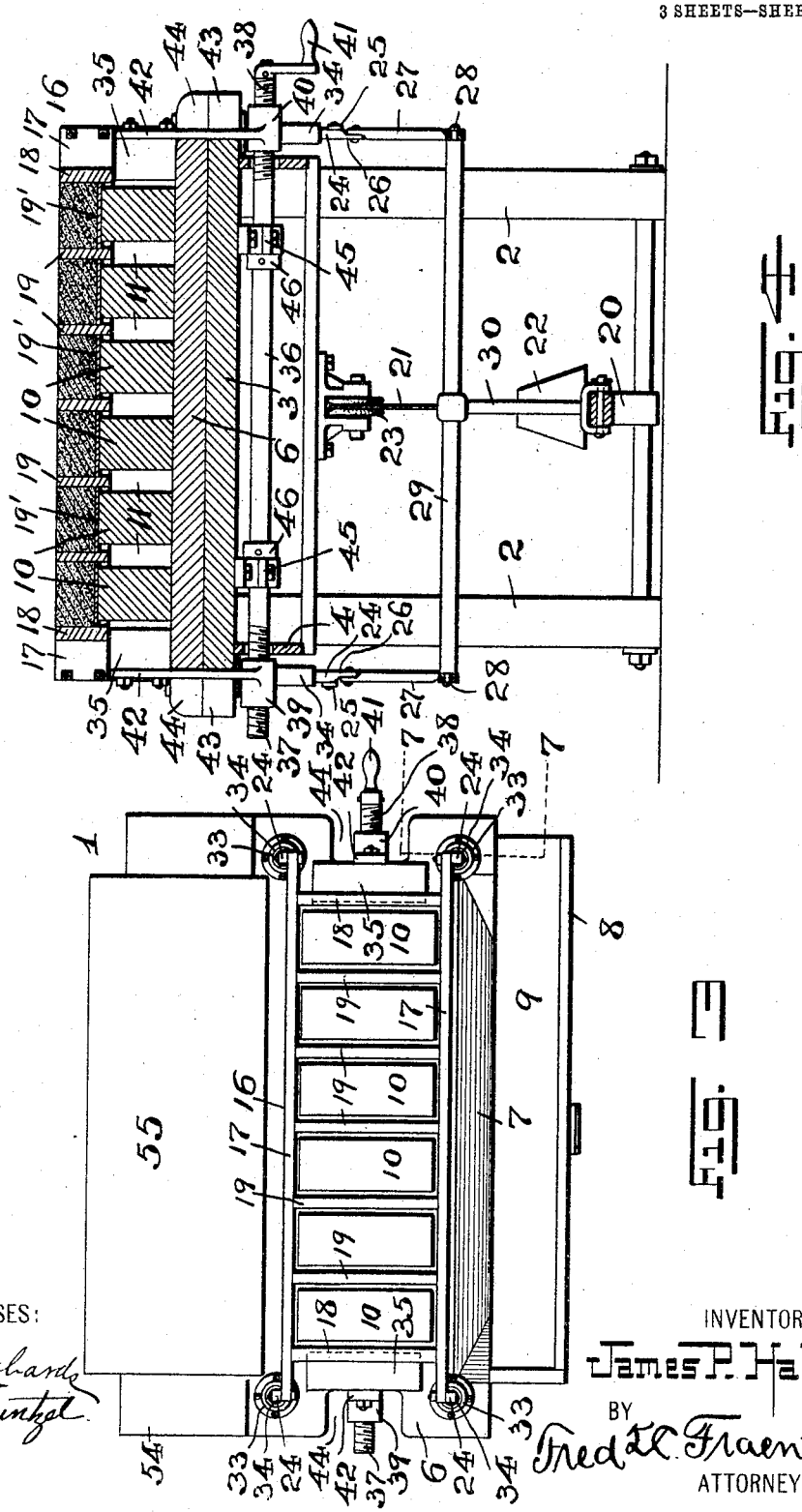

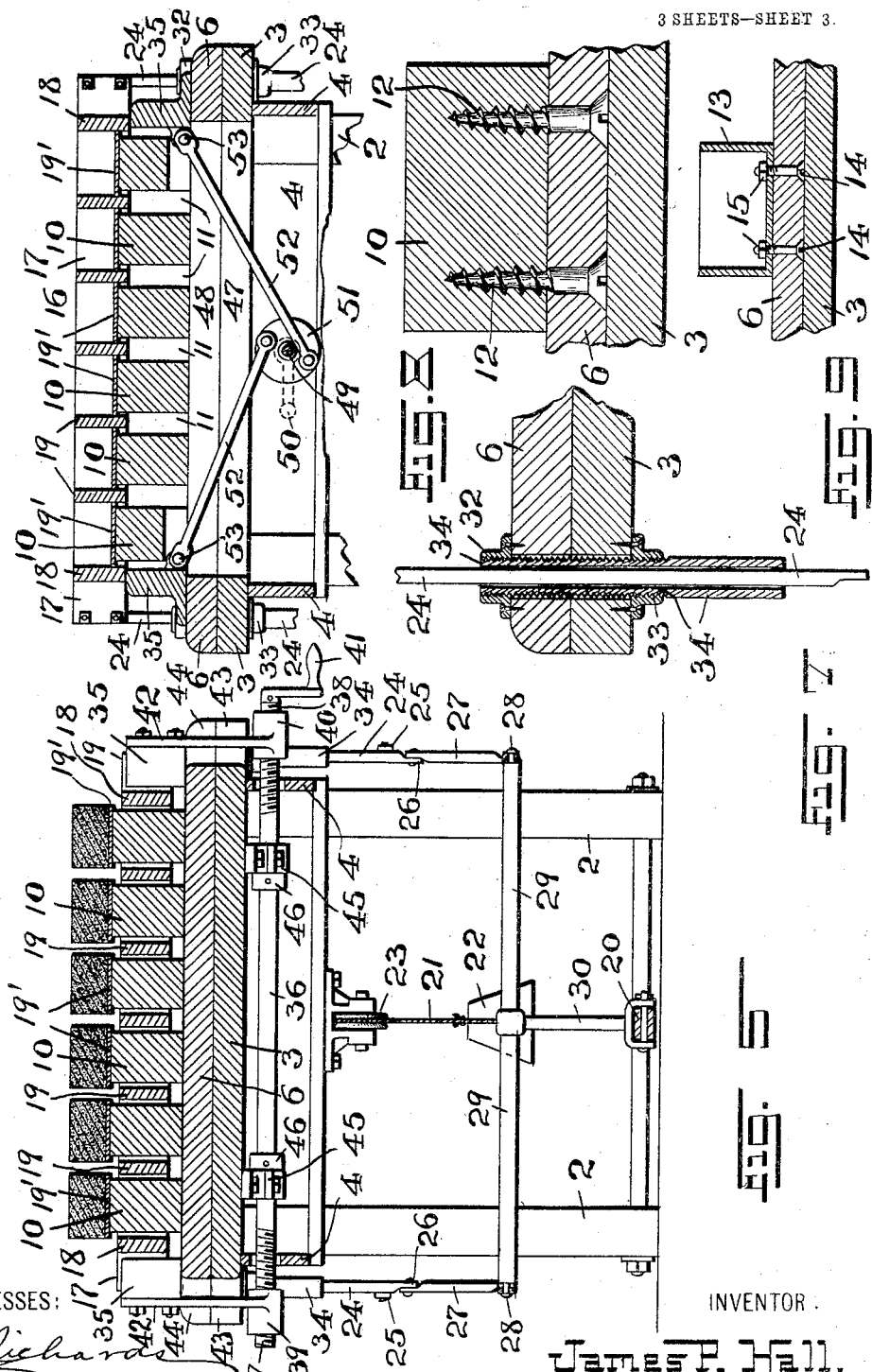

JAMES P. HALL, OF JERSEY CITY, NEW JERSEY.

MOLDING MACHINE OR APPARATUS.

No. 796,640.  Specification of Letters Patent.  Patented Aug. 8, 1905.

Application filed October 4, 1904. Serial No. 227,122.

*To all whom it may concern:*

Be it known that I, JAMES P. HALL, a citizen of the United States, residing at Jersey City, in the county of Hudson and State of New Jersey, have invented certain new and useful Improvements in Molding Machines or Apparatus; and I do hereby declare the following to be a full, clear, and exact description of the invention, such as will enable others skilled in the art to which it appertains to make and use the same, reference being had to the accompanying drawings, and to numerals of reference marked thereon, which form a part of this specification.

This invention has reference generally to improvements in molding machines or apparatus; and the invention relates more particularly to a novel molding machine or apparatus used for the purpose of molding concrete blocks or bricks made from a mixture of cement and sand, but which may be employed for various other purposes where a molding-machine can be put to practical use.

The principal object of the present invention is to provide a molding machine or apparatus of the character hereinafter set forth which shall be of a very simple construction and is easily manipulated to produce in rapid succession a great many bricks or the like at a great reduction of time and expense in the manufacture of the brick and at the same time producing a great labor-saver, as far as making and handling the brick is concerned, and accomplishing the same amount of work in less time than heretofore.

Other objects of my present invention not at this time more particularly mentioned will be obvious from the following specification.

With the various objects of my invention in view the same consists in the novel molding machine or apparatus hereinafter more fully set forth; and, furthermore, this invention consists in the novel arrangements and combinations of devices and various mechanisms comprising the molding machine or apparatus, as well as in the details of the construction of the parts thereof, all of which will be fully described in the following specification and then finally embodied in the clauses of the claim which is appended to and which forms an essential part of the said specification.

The invention is clearly illustrated in the accompanying drawings, in which—

Figure 1 is a front elevation of a molding machine or apparatus embodying the principles of the present invention; and Fig. 2 is a transverse vertical section of the same, the said section being taken on line 2 2 in Fig. 1 of the drawings looking in the direction of the arrow $x$. Fig. 3 is a top or plan view of the same, and Fig. 4 is a central longitudinal vertical section showing a mixture of cement and sand molding in the shapes of bricks in a reciprocatory molding-frame of the apparatus. Fig. 5 is a similar sectional representation of the molding machine or apparatus, showing the reciprocatory molding-frame in its lowered position with the molded bricks removed from its molding pockets or compartments. Fig. 6 is a longitudinal vertical section of the upper portion of a molding machine or apparatus, a support thereon, and showing a modified means for retaining the reciprocatory molding-frame in its normally raised position. Fig. 7 is a detail vertical section taken on line 7 7 in said Fig. 3, said section being made on an enlarged scale. Fig. 8 is a detail vertical sectional representation, on an enlarged scale, of one of the pallet-supporting blocks, showing one means of securing such pallet-supporting blocks upon an auxiliary support of the table; and Fig. 9 is a sectional representation of another form of pallet-supporting block and means for securing it in position.

Similar characters of reference are employed in the above-described views to indicate corresponding parts.

Referring now to the said drawings, the reference character 1 indicates the complete molding machine or apparatus, the same comprising a suitable supporting-frame or standards 2 and a bed or table 3, having the upper connecting-pieces 4 and tie-bolts 5, substantially as illustrated in the several figures of the drawings. The said parts of the framework and table or bed of the apparatus are preferably made of wood; but other material, such as metal, may be employed, and the shape and general configuration of the machine and the manner of connecting the parts may be departed from, if desired. Suitably arranged upon the upper surface of the said bed or table 3 is an auxiliary support 6, which is provided along one of its marginal edges with a chamfered portion 7, as clearly illustrated in Fig. 3 of the drawings, and which forms a discharging duct or passage-way to an inclined chute 8, suitably secured upon the front of the framework of the machine and having its inclined bottom 9 leading, preferably, to one of the ends of the machine. The purpose of the said inclined or chamfered portion 7 is that the excess of sand, cement, and the like may be readily dusted or swept from the said chamfered discharging edge of the auxiliary support 6 into the said chute 8 and down its inclined bottom 9 to one side of the machine or apparatus, as will be clearly understood. Suitably disposed upon the upper surface of the said auxiliary support 6 are any desired number of pallet-supporting blocks 10, arranged, as will be seen from an inspection of the several figures of the drawings, with the spaces 11 between them. The blocks 10, as indicated in Fig. 8 of the drawings, may be made of wood, in which case they are secured in their respective positions upon the auxiliary support 6 by means of ordinary wood-screws 12, as shown; but in place of these blocks 10 of wood I may use pallet-supporting blocks or supports 13 of metal, as indicated in Fig. 9 of the drawings, these supports for lightness in weight and cheapness of construction being cast hollow and being secured to the auxiliary support 6 by means of bolts 14 and nuts 15, as shown. A molding-frame 16 is arranged in its normal initial position above the upper or supporting surfaces of the said pallet-supports, with the upper portions of said pallet-supports preferably extending slightly into the molding-compartments of the frame 16, as will hereinafter appear. The said molding-frame 16 is capable of a downward movement over the said pallet-supports in the manner to be presently described and as clearly indicated in Fig. 5 of the drawings. The said molding-frame 16, as will be seen from an inspection of the several figures of the drawings, consists, essentially, of a suitable frame formed with the side pieces 17 and the end pieces 18, suitably-disposed partitions 19 being arranged between the said side pieces 17, as shown, and forming with the said sides 17 and ends 18 suitable forming compartments or openings for the reception of suitable pallets 19', adapted to be arranged upon the upper surface of each pallet-supporting block in the manner clearly illustrated. Thus when the molding-frame 16 is in its raised position (indicated in Figs. 1, 2, and 4 of the drawings) the said pallets 19', which may be made of wood, metal, glass, or other suitable material, form, with the surrounding portions of the frame 16, suitable molds, one above each pallet-supporting block, in which the material for producing a brick or the like can be arranged and is tamped in position. The downward movement of the said molding-frame 16 is produced by means of a suitable foot-treadle 20, to which may be attached a flexible connection 21 and a weight 22, said connection 21 being passed over a suitable sheave or grooved wheel 23 for returning the treadle to its normally raised position when the foot has been removed therefrom. The said molding-frame 16 is connected with the foot-treadle 20 in any suitable manner, but preferably by means of the framework shown in the drawings, which consists, essentially, of four guide-rods 24, suitably secured at their ends to the end portions of the side pieces 17 of the frame 16 and said guide-rods extending into and being movably arranged in correspondingly-placed guides extending through the bed or table 3 and the support 6 thereon. At their lower end portions each pair of said guide-rods 24 are rigidly connected by a rod or bar 25, and pivotally attached to the lower ends 26 of each pair of guide-rods 24 are links 27, which in turn are pivotally attached at their lower ends, as at 28, to a cross-bar 29, substantially as shown. A link 30 is connected at its upper end with this rod 29, said link being pivotally attached at its lower end portion by means of a pin 31 to the foot-treadle 20. The guides in which the said guide-rods 24 are movably arranged and which are for the purpose of producing a true vertical reciprocatory movement of the said molding-frame 16 consist, essentially, of screw-threaded pipe-sockets 32 and 33 and a connecting-pipe 34, provided with an external screw-thread screwed in the sockets 32 and 33, which are respectively secured upon the upper face of the support 6 and against the under surface of the bed or table 3 and are in alinement with the oppositely-placed openings in the said parts, as will be clearly understood from an inspection of Figs. 2 and 7 of the drawings. That the said forming or molding frame 16 may be rigidly supported in its relatively raised position above the pallet-supporting blocks while tamping the material into the forms produced above the said blocks I have arranged upon the said support 6, at each end thereof, a slide 35, each slide being capable of being moved beneath the end piece 18 of the frame 16, as shown in Figs. 3 and 4 of the drawings, and thus serving as supports upon which the said frame rests while the material to be molded or shaped is being tamped. The said slides 35 may be moved in opposite outward directions away from the said end pieces 18 of the frame 16 when it is desired to lower said frame by means of a shaft or spindle 36, provided at its end portions, respectively, with right and left screw portions 37 and 38, upon which are movably arranged correspondingly-formed screw collars or nuts 39 and 40. The said shaft or spindle 36 can be turned in either direction by means of a crank 41, and extending in an upward direction from each screw collar or nut on said shaft or spindle is a post or bar 42, movably arranged in the open or cut-away portions 43 and 44 of the bed or table 3 and the said auxiliary support 6, respectively, and suitably secured to the respective slides 35. It will thus be evident that by turning the said shaft or spindle 36 the said slides can be moved simultaneously in opposite directions either outwardly or inwardly, according to the direction of rotation of the said shaft or spindle, to enable the frame 16 to be lowered or to enable the said slides to act as supports when the said frame 16 is in its raised position. The said shaft or spindle 36 is rotatably arranged in suitable bearings 45, secured upon the under side of the bed or table 3, the shaft or spindle being provided with suitable collars or other enlargements, as 46, or other means to prevent any lateral displacement of the shaft. In lieu of this mechanism for producing the reciprocatory movements of the said slides 35 a modified means (represented in Fig. 6 of the drawings) may be employed. With this form of mechanism the bed or table 3 is provided with a longitudinally-extending opening 47, and in the support 6 is a correspondingly-arranged opening 48. A shaft or spindle 49 extends laterally beneath the said bed or table 3, the said shaft or spindle 49 being turned by means of a crank 50. The said shaft or spindle 49 is provided with a disk or crank 51, and pivotally connected with the said disk or crank are a pair of connecting rods or links 52, which extend upwardly and in opposite directions through the openings 47 and 48 and are respectively pivotally connected, as at 53, with the respective slides 35, substantially in the manner illustrated. The operations of this mechanism for sliding the slides 35 in their opposite outward or inward directions will be clearly understood from an inspection of said Fig. 6 of the drawings.

The manner of operating the machine or apparatus 1 after the material has been molded or formed upon the pallets 19' as illustrated in Fig. 4 briefly is as follows: The material having been sufficiently tamped to provide the bricks or molded blocks, the slides 35 are moved oppositely in their outward directions to bring the said slides in the positions indicated in Fig. 5 of the drawings. The operator then applies pressure upon the foot-treadle 20 to thereby bring the frame 16 from its previously-raised position (indicated in Figs. 1, 2 and 4) to its lowered position. (Shown in Fig. 5 of the drawings.) Still retaining the foot upon the treadle, the bricks or molded blocks resting upon the pallets 19', which have been removed with the said bricks or blocks from the forming-compartments of the molding-frame 16 and remain upon the supporting-blocks 10, are then by means of a board or other suitable device pushed upon a pallet or board 55, resting upon a block or support 54, as represented in Figs. 2 and 3 of the drawings, thence to be carried away for drying and curing in the usual manner. The pressure is now removed from the treadle and the frame 16 allowed to resume its normally raised relation with the pallet-supporting blocks, the slides 35 being returned to their supporting positions beneath the end pieces 18 of the frame 16 in the manner above stated and the pallets 19' then being replaced upon the supporting-blocks 10.

From the foregoing description of my invention it will be clearly seen that I have devised a simply-constructed and efficiently-working molding machine or apparatus in which bricks and other bodies can be rapidly formed in large quantities.

Of course I am aware that changes may be made in the arrangements and combinations of the various devices and mechanisms for producing the reciprocatory movements of a molding-frame no matter whether the forming is done upon pallets placed upon pallet-supporting blocks or otherwise, and I am aware also that changes may be made in the details of the construction of the various parts of the machine without departing from the scope of my present invention. Hence I do not limit my invention to the exact arrangements and combinations of the devices and mechanisms, nor to the parts thereof as described in the foregoing specification and as illustrated in the accompanying drawings, nor do I confine myself to the exact details of the construction of the said parts.

Having thus described my invention, what I claim is—

1. In a molding apparatus, the combination, with a supporting bed or table, and a series of pallet-supporting blocks, of a pallet upon each block, a molding-frame upon said table having molding-compartments in each one of which a portion of such pallet-supporting block and the pallet thereon is arranged, means for retaining said molding-frame in its normally raised position, and means for lowering said frame over said pallet-supporting blocks for simultaneously raising said pallets and the molded material above the compartments of said frame, consisting, essentially, of tubular guides connected with the said bed or table, a set of guide-rods connected with each end of said molding-frame, each guide-rod extending into and being movably arranged in a guide, a foot-treadle and a connecting-link connection between the said guide-rods and treadle, substantially as and for the purposes set forth.

2. In a molding apparatus, the combination, with a supporting bed or table, of a molding-frame upon said bed or table, mechanism for producing reciprocatory movements of said molding-frame, and slides upon said table adapted to be moved beneath said frame for holding said frame rigidly in its raised position, substantially as and for the purposes set forth.

3. In a molding apparatus, the combination, with a supporting bed or table, of a molding-frame upon said bed or table, mechanism for producing reciprocatory movements of said molding-frame, slides upon said table adapted to be moved beneath said frame for holding said frame rigidly in its raised position, and means for moving said slides in opposite directions, consisting of a shaft having right and left handed screw portions, a nut upon each screw portion, and a connecting-bar between each nut and slide, substantially as and for the purposes set forth.

4. In a molding apparatus, the combination, with a supporting bed or table, and a series of pallet-supporting blocks, of a pallet upon each block, a molding-frame upon said table having molding-compartments in each one of which a portion of such pallet-supporting block and the pallet thereon is arranged, mechanism for producing reciprocatory movements of said frame, and slides upon said table to be moved beneath said frame for holding said frame rigidly in its raised position, substantially as and for the purposes set forth.

5. In a molding apparatus, the combination, with a supporting bed or table, and a series of pallet-supporting blocks, of a pallet upon each block, a molding-frame upon said table having molding-compartments in each one of which a portion of such pallet-supporting block and the pallet thereon is arranged, mechanism for producing reciprocatory movements of said frame, slides upon said table to be moved beneath said frame for holding said frame rigidly in its raised position, and means for moving said slides in opposite directions, consisting of a shaft having right and left handed screw ends, a nut upon each screw end, and a connecting-bar between each nut and slide, substantially as and for the purposes set forth.

6. In a molding apparatus, the combination, with a supporting bed or table, of a molding-frame comprising side pieces 17, end pieces 18, and transverse partitions, and means for holding said frame in a raised position above said bed or table, consisting of oppositely-moving slides in supporting engagement with the said end pieces 18, substantially as and for the purposes set forth.

7. In a molding apparatus, the combination, with a supporting bed or table, of a molding-frame comprising side pieces 17, end pieces 18, and transverse partitions, means for holding said frame in a raised position above said bed or table, consisting of oppositely-moving slides in supporting engagement with the said end pieces 18, and means for moving said slides in opposite directions, consisting of a shaft having right and left-handed screw portions, a nut upon each screw portion, and a connecting-bar between each nut and slide, substantially as and for the purposes set forth.

8. In a molding apparatus, the combination, with pallet-supporting blocks and a pallet upon each block, of a molding-frame having molding-compartments normally arranged above the said supporting-blocks and the pallets thereon, means for moving said frame and its compartments about the said pallet-supporting blocks, and slides adapted to be brought in supporting holding engagement with the end portions of said frame for rigidly holding said frame in its raised position, substantially as and for the purposes set forth.

9. In a molding apparatus, the combination, with pallet-supporting blocks and a pallet upon each block, of a molding-frame having molding-compartments normally arranged above the said supporting-blocks and the pallets thereon, means for moving said frame and its compartments about the said pallet-supporting blocks, and slides adapted to be brought in supporting holding engagement with the end portions of said frame for rigidly holding said frame in its raised position, and means for moving said slides in opposite directions, consisting of a shaft having right and left handed screw portions, a nut upon each screw portion, and a connecting-bar between each nut and slide, substantially as and for the purposes set forth.

10. In a molding apparatus, the combination, with a supporting table or bed, and an auxiliary support thereon provided with a chamfered sand-discharging edge, a molding-frame, and a chute secured at one side of said table or bed, substantially as and for the purposes set forth.

11. In a molding apparatus, the combination, with the framework and a supporting table or bed of the apparatus, of an auxiliary support upon said table or bed provided with a chamfered sand-discharging edge, a molding-frame, and a chute secured to the front of the said framework, said chute having an open receiving portion communicating with the said chamfered discharging edge of the auxiliary support, and an inclined bottom leading to a discharging end of said chute at the one side of said molding apparatus, substantially as and for the purposes set forth.

In testimony that I claim the invention set forth above I have hereunto set my hand this 30th day of September, 1904.

JAMES P. HALL.

Witnesses:
FREDK. C. FRAENTZEL,
GEO. D. RICHARDS.